United States Patent [19]

Watanabe

[11] Patent Number: 5,737,616
[45] Date of Patent: Apr. 7, 1998

[54] POWER SUPPLY CIRCUIT WITH POWER SAVING CAPABILITY

[75] Inventor: Mitsuhiro Watanabe, Tokyo, Japan

[73] Assignee: NEC Corporation, Tokyo, Japan

[21] Appl. No.: 647,742

[22] Filed: May 15, 1996

[30] Foreign Application Priority Data

May 15, 1995 [JP] Japan ................................. 7-115616

[51] Int. Cl.⁶ ............................. G06F 1/26; G06F 1/32
[52] U.S. Cl. ............................. 395/750.08; 395/750.01; 395/750.04; 395/560; 395/750.05; 364/492
[58] Field of Search .................. 395/750, 560, 395/750.01, 750.04, 750.05, 750.08; 364/707, 483, 492

[56] References Cited

U.S. PATENT DOCUMENTS

| | | | |
|---|---|---|---|
| 4,785,406 | 11/1988 | Lunderius et al. | 364/483 |
| 5,230,074 | 7/1993 | Canova, Jr. et al. | 395/750 |
| 5,457,801 | 10/1995 | Aihara | 395/750 |
| 5,606,704 | 2/1997 | Pierce et al. | 395/750 |
| 5,625,807 | 4/1997 | Lee et al. | 395/560 |
| 5,632,038 | 5/1997 | Fuller | 395/750 |

FOREIGN PATENT DOCUMENTS

| | | |
|---|---|---|
| 60-254487 | 12/1985 | Japan . |
| 2-201516 | 8/1990 | Japan . |
| 3-210617 | 9/1991 | Japan . |
| 4-125718 | 4/1992 | Japan . |
| 4-130510 | 5/1992 | Japan . |
| 5-324139 | 12/1993 | Japan . |

OTHER PUBLICATIONS

Toranjisuta Gijutu, Jul. 1995, pp. 207–229.

*Primary Examiner*—Gopal C. Ray
*Attorney, Agent, or Firm*—Sughrue, Mion, Zinn, Macpeak & Seas, PLLC

[57] ABSTRACT

A power supply circuit efficiently saves electric energy consumed by a central processing unit and a peripheral assembly through coordination between power supply modes of the central processing unit and the peripheral assembly. The central processing unit has a register for establishing a status of an internal power supply of the central processing unit, a first mechanism for changing the internal power supply into the status established by the register, and a second mechanism for outputting a status signal indicative of the status. The peripheral assembly having a peripheral circuit, a peripheral device, and a power supply control block for changing power supply statuses and clock statuses of the peripheral circuit and the peripheral device based on the status signal outputted from the second mechanism.

8 Claims, 10 Drawing Sheets

POWER SUPPLY CIRCUIT WITH POWER SAVING CAPABILITY

BACKGROUND OF THE INVENTION

1. Field of the Invention

The present invention relates to a power supply circuit with a power saving capability, and more particularly to a power supply circuit which can reduce the consumption of electric energy by a device that has a central processing unit (CPU) and is powered primarily by a battery.

2. Description of the Prior Art

Heretofore, desktop personal computers which are supplied with electric energy from external AC power outlets have been in widespread use. Unlike battery-powered devices, such desktop personal computers do not incorporate features that minimize their consumption of electric energy.

Now, there are many types of small portable computer devices including laptop computers, notebook computers, and pocket computers, which can be used in places where no external AC power outlets are available. Those small portable computer devices are powered principally by rechargeable batteries.

Such battery-powered devices can no longer operate when their batteries run out of stored electric energy while in use. The limited electric energy storage capability of the batteries imposes limitations on battery-powered devices with a large power requirement in that they cannot operate for a long period of time after the batteries are charged.

There are available four alternative methods for minimizing the consumption of electric energy by battery-powered devices.

According to the first method, a battery-powered device is made up of components each having a low power requirement for thereby reducing overall power consumption.

The second method uses a power controller for turning on and off a peripheral device according to a preset value established by a CPU.

According to the third method, the period of time for which a computer can operate is increased by intermittently turning off the power supply of the entire system as by switching it off when there is no input signal entry through a keyboard for a given period of time.

The fourth method combines a CPU and an operating system (OS) into a composite system which operates such that the OS recognizes the manner in which the CPU operates and varies a clock frequency of the CPU and the entire system depending on the recognized mode of operation of the CPU.

One general approach to minimizing the consumption of electric energy by a system is to make up the system of components each having a low power requirement and then to reduce the consumption of electric energy while each of the components is not active. According to this general approach, the first method described above comes first for consideration, and is followed by the second, third, and fourth methods.

Various attempts have been made to realize the second alternative. For example, Japanese laid-open patent publication No. 60-254487 discloses a method of suppressing the consumption of electric energy by a semiconductor integrated circuit by shutting down the circuit with a power-down mechanism incorporated in the circuit which operates in response to an external power-down signal. According to a power saving method revealed in Japanese laid-open patent publication No. 2-201516, a power control register is accessible by a CPU, and a switch means can permit and inhibit the supply of electric energy to a clock generator depending on the state of a predetermined bit in the power control register, so that the consumption of electric energy is reduced by setting the bit to a given value in the power control register. Japanese laid-open patent publication No. 5-324139 shows a power-down control method for controlling the individual supply of electric energy to a plurality of functional units including a CPU with a power-saving control register.

One specific example of the third method is a power-saving control method disclosed in Japanese laid-open patent publication No. 4-125718. According to the disclosed power-saving control method, a low-power mode is initiated to reduce electric energy consumption in the absence of a keyboard input signal for a certain period of time as confirmed by the count of an interval timer which operates in response to a input request from an application program. Japanese laid-open patent publication No. 4-130510 shows a power-saving method for an information processing apparatus as another example of the third method. According to the disclosed power-saving method, the operating clock frequency of a CPU is changed to reduce electric energy consumption in the absence of a keyboard input signal for a certain period of time.

Japanese laid-open patent publication No. 3-210617 discloses a process of and an apparatus for saving electric energy on a real-time basis for a portable computer according to the fourth method. In the disclosed process and apparatus, an OS calculates the frequency of operation of a CPU and varies a clock frequency of the CPU and the entire system such that when the frequency of operation is lower, the clock frequency is reduced in a manner to shut off the CPU.

However, the above first through fourth methods suffer the following problems:

The first method which employs components each having a low power requirement suffers certain limitations. If a system uses many peripheral circuits, then simultaneous operation of the peripheral circuits causes the system to consume a large amount of electric energy even if each of the peripheral circuits has a low power requirement. Accordingly, power supply control is necessary for each of the peripheral circuits.

According to the second method, when a CPU is shut off in a sleep mode or the like, the consumption of electric energy cannot be controlled because a register would be needed to be set to a value by the CPU. In addition, while a radio communication device such as a portable telephone set is in operation, it is desirable to reduce the amount of electric energy consumed thereby and also to shut off a noise source such as a CPU in the radio communication device while radio waves are being transmitted and received. However, if the CPU is shut off, then the consumption of electric energy cannot be reduced, and the CPU cannot be restarted since the radio communication device has no means to start the CPU.

According to the third method, the consumption of electric energy is reduced insofar as no keyboard signal is applied. However, if a plurality of devices are connected to a CPU or a personal computer, then they cannot be controlled properly because the CPU or the personal computer is interfaced with keyboard input signals only and not with the other connected devices. For example, if a DMA facility is used as a means for transferring data, then there may possibly be a condition in which the CPU is not operating and there is no keyboard input signal for a given period of time while the DMA facility is in operation. When there is no keyboard input signal for the given period of time before the transfer of data through the DMA facility is completed, the clock frequency of the CPU is lowered or the power supply of the system is shut off though the DMA facility is in operation.

According to the fourth method, since an OS controls power-saving operation, if the OS is changed, then the power-saving program has to be rewritten. Furthermore, while the clock frequency of a CPU is controlled for power saving depending on the operation of the CPU, the consumption of electric energy is not controlled depending on how peripheral devices connected to the CPU operate.

SUMMARY OF THE INVENTION

It is therefore the first object of the present invention to provide a power supply circuit with a power saving capability for establishing an initial setting for a power supply controller to allow the power supply controller to automatically control, based on the initial setting, the power supply of a peripheral assembly and a system clock frequency depending on the power supply mode of a CPU.

The second object of the present invention is to provide a power supply circuit with a power saving capability for monitoring a peripheral assembly for their operation with a power supply controller to allow the power supply controller to control the power supply of the peripheral assembly and a system clock frequency depending on the monitored operation of the peripheral assembly.

To achieve the first object of the present invention, there is provided in accordance with the present invention a power supply circuit comprising a central processing unit and a peripheral assembly connected to the central processing unit, the central processing unit having a register for establishing a status of an internal power supply of the central processing unit, a first mechanism for changing the internal power supply into the status established by the register, and a second mechanism for outputting a status signal indicative of the status, the peripheral assembly having a peripheral circuit, a peripheral device, and control means for changing power supply statuses and clock statuses of the peripheral circuit and the peripheral device based on the status signal outputted from the second mechanism. The control means may comprise means for determining priority ranks of the peripheral circuit and the peripheral device based on the status signal and changing the power supply statuses of the peripheral circuit and the peripheral device according to the determined priority ranks. The register, the first mechanism, and the second mechanism may comprise a power supply mode control register, and the control means may comprise a power supply control block, wherein the power supply mode control register controls the power supply statuses and clock statuses which are changed by the power supply control block. The power supply control block may be programmable by an external signal.

According to the present invention, the second object can be accomplished by a power supply circuit comprising a central processing unit and a peripheral assembly connected to the central processing unit, the peripheral assembly having a peripheral circuit, a peripheral device, a power supply control block for varying power supply statuses or clock frequencies of the peripheral circuit and the peripheral device according to a setting, and a first mechanism for outputting a status signal indicative of the power supply statuses of the peripheral circuit and the peripheral device based on the setting, the central processing unit having a second mechanism for changing power supply statuses and clock statuses thereof based on the status signal outputted from the first mechanism. The second mechanism may comprise means for determining priority ranks of the peripheral circuit and the peripheral device based on the status signal and changing the power supply statuses and clock statuses of the central processing unit based on the status signal. The second mechanism may comprise power supply mode control input means for changing the power supply statuses of the central processing unit as controlled by data established in the power supply control block. The power supply control block may be programmable by an external signal.

The power supply circuits according to the present invention are based on coordination of power supply modes of the central processing unit and the peripheral assembly, and offers the following advantages:

When the saving of electric energy is controlled primarily by the central processing unit, the power supply mode and the peripheral assembly are controlled in a manner to be suitable for the central processing unit for efficiently reducing the consumption of electric energy.

When the saving of electric energy is controlled primarily by the peripheral assembly, the power supply mode of the central processing unit can be determined in a manner to match the power supply status of the peripheral assembly for efficiently reducing the consumption of electric energy.

The above and other objects, features, and advantages of the present invention will become apparent from the following description with reference to the accompanying drawings which illustrate examples of the present invention.

DETAILED DESCRIPTION OF THE PREFERRED EMBODIMENTS

Power supply circuits with a power saving capability according to first and second embodiments of the present invention have CPU power supply modes which a CPU itself has for controlling the consumption of electric energy thereby. When power supply modes of the CPU are changed, the internal status of the CPU with respect to its consumption of electric energy is varied.

First, a means for controlling peripheral circuits or peripheral devices by changing power supply modes of the CPU will be described below.

Figure 1:
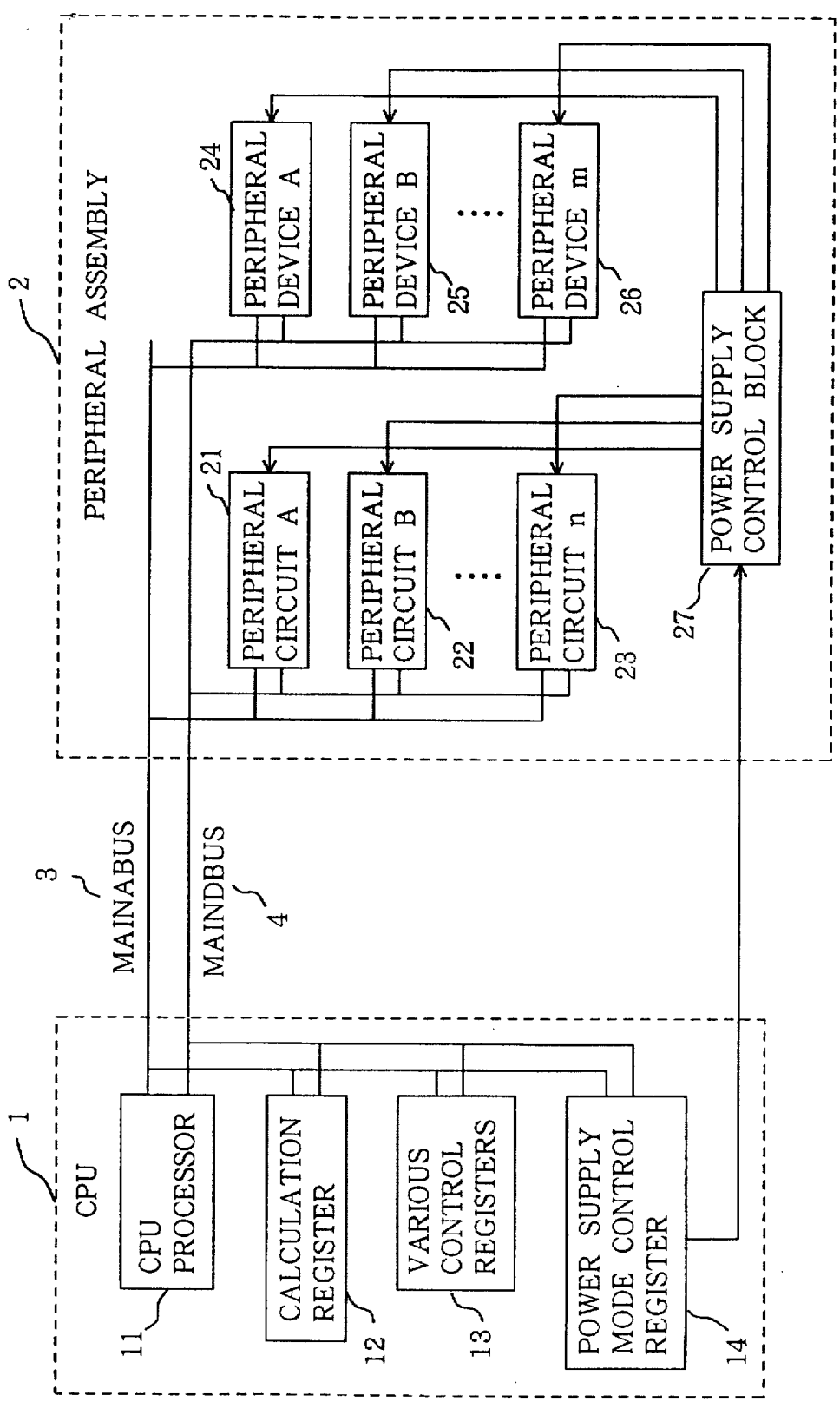
FIG. 1 is a block diagram of a power supply circuit with a power saving capability according to a first embodiment of the present invention, the power supply circuit being incorporated in a system including a CPU, a peripheral assembly, and common buses and capable of saving electric energy primarily under the control of the CPU.

FIG. 1 shows in block form the power supply circuit with the power saving capability according to the first embodiment of the present invention, the power supply circuit being incorporated in a system including a CPU, a peripheral assembly, and common buses.

The power supply circuit according to the first embodiment is used mainly in combination with microcomputers having inexpensive buses of low-bit bus configuration.

As shown in FIG. 1, a CPU 1 according to the first embodiment comprises a CPU processor 11 for decoding instructions, carrying out calculations and processing operations, and controlling registers, a calculation register 12, various control registers 13 including a general register, a programmable counter, a status register, an instruction registers, etc., and a power supply mode control register 14 for establishing and controlling power supply modes for the CPU 1.

Figure 3:
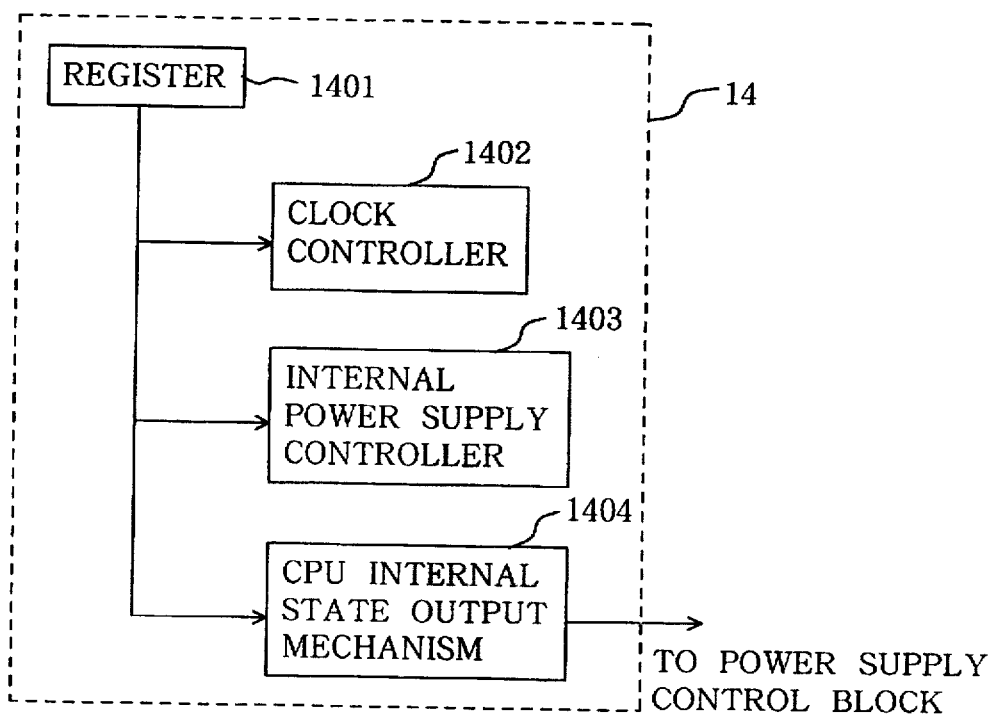
FIG. 3 is a block diagram of a power supply mode control register in the power supply circuit shown in FIG. 1.

As shown in FIG. 3, the power supply mode control register 14 comprises a register 1401 for receiving and holding control information for power supply control from the CPU processor 11, a clock controller 1402 for changing a clock frequency used in the CPU processor 11, an internal power supply controller 1403 for switching on and off an internal block of the CPU processor 11, and a CPU internal state output mechanism 1404 for determining a present power supply status of the CPU from the setting in the register 1401 and indicating the present power supply state to a peripheral assembly 2 (shown in FIG. 1).

As shown in FIG. 1, the CPU processor 11, the calculation register 12, the various control registers 13, and the power supply mode control register 14 are connected to a main address bus (MAINABUS) 3 and a main data bus (MAINDBUS) 4.

In FIG. 1, the CPU processor 11 decodes instructions sent from the instruction register among the various control registers 13, and effects various calculations and processing operations.

If an instruction from the instruction register represents a power supply mode, then the CPU processor 11 establishes a CPU power supply mode in the power supply mode control register 14. The CPU 1 now enters the established CPU power supply mode, and the power supply mode control register 14 outputs a status signal indicative of the CPU power supply mode.

As shown in FIG. 1, the peripheral assembly 2 according to the first embodiment comprises a plurality of peripheral circuits A(21), B(22), ..., n(23), a plurality of peripheral devices A(24), B(25), ..., m(26), and a power supply control block 27 for controlling power supplies or clock signals of the peripheral circuits A(21), B(22), ..., n(23) and the peripheral devices A(24), B(25), ..., m(26). The peripheral circuits A(21), B(22), ..., n(23) and the peripheral devices A(24), B(25), ..., m(26) are connected to the main address bus 3 and the main bus 4.

Figure 4:
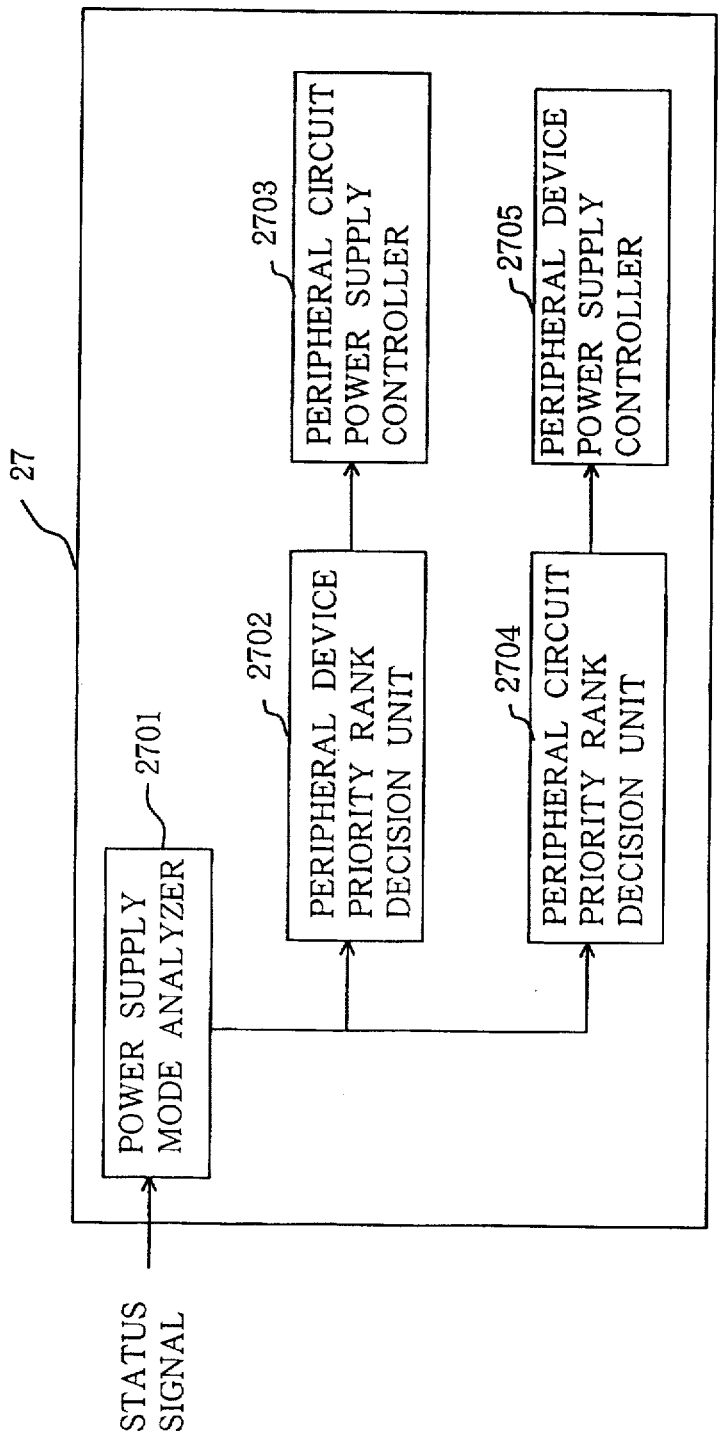
FIG. 4 is a block diagram of a power supply control block in the power supply circuit shown in FIG. 1.

As shown in FIG. 4, the power supply control block 27 comprises a power supply mode analyzer 2701 for analyzing a status signal outputted from the power supply mode control register 14, a peripheral circuit priority rank decision unit 2702 for determining priority ranks by which the power supplies of the peripheral circuits are to be switched on and off, based on the analyzed result from the power supply mode analyzer 2701, a peripheral circuit power supply controller 2703 for turning on and off the power supplies of the peripheral circuits A(21), B(22), ..., n(23), a peripheral device priority rank decision unit 2704 for determining priority ranks by which the power supplies of the peripheral devices are to be switched on and off, based on the analyzed result from the power supply mode analyzer 2701, and a peripheral device power supply controller 2705 for turning on and off the power supplies of the peripheral devices A(24), B(25), ..., m(26).

Figure 5:
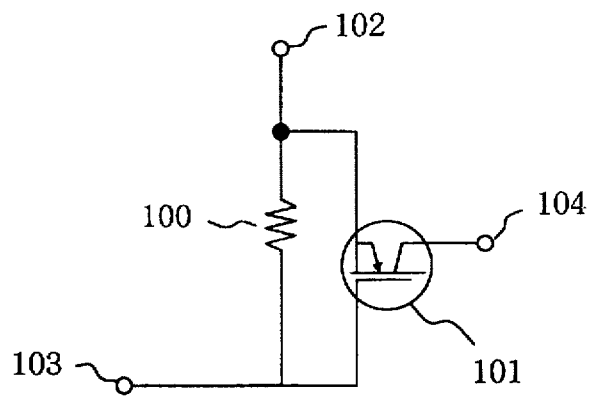
FIG. 5 is a circuit diagram of a power supply electronic switch.

The power supply control block 27 outputs "ON" or "OFF" information according to initial settings based on the status signal outputted from the power supply mode control register 14, to the peripheral circuits A(21), B(22), ..., n(23) and the peripheral devices A(24), B(25), ..., m(26). Each of the peripheral circuits A(21), B(22), ..., n(23) and the peripheral devices A(24), B(25), ..., m(26) has a power supply terminal which is supplied with electric energy through an electronic switch shown in FIG. 5. Specifically, as shown in FIG. 5, the electronic switch comprises a resistor 100 connected between a power supply terminal 102 connected to a power supply and a control terminal 103 connected to the power supply control block 27, and an FET 101 having a source connected to the power supply terminal 102, a gate connected to the power supply control block 27, and a drain connected to a power output terminal 104 which is joined to the peripheral circuit or device. The power supply control block 27 supplies an "ON" or "OFF" control signal to the control terminal 103 to control electric energy supplied from the power supply terminal 102 with the FET 101 for application to the power output terminal 104.

CPU power supply modes available for the CPU 1 are as follows:

(1) "Full": In this mode, all the functions of the CPU 1 can be performed;

(2) "Down": In this mode, the CPU 1 operates at a lowered clock speed. The CPU 1 goes to the "Full" mode upon an interrupt that occurs in the operation of the CPU 1.

(3) "Sleep": In this mode, the CPU 1 is stopped except when an interrupt occurs. The CPU 1 goes to the "Full" mode upon an interrupt that occurs in the operation of the CPU 1.

(4) "Die": In this mode, the CPU 1 is fully stopped. The CPU 1 goes to the "Full" mode in response to a reset signal.

Figure 6:
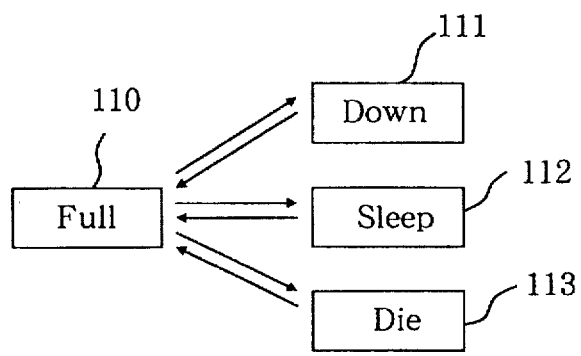
FIG. 6 is a diagram showing how transitions are made between power supply modes of the CPU.

Transitions between these CPU power supply modes are shown in FIG. 6. In FIG. 6, the "Full" mode, the "Down" mode, the "Sleep" mode, and the "Die" mode are represented by 110, 111, 112, 113, respectively.

The amounts of electric energy which are consumed by the respective CPU power supply modes are successively smaller in the order named above as shown below:

Full>Down>Sleep>Die.

Times required by transitions from the "Down" mode, the "Sleep" mode, and the "Die" mode to the "Full" mode are successively shorter in the order named above as shown below:

Down>Sleep>Die.

For a transition from one to another of the CPU power supply modes shown in FIG. 6, the power supply mode control register 14 outputs a 2-bit status signal indicative of the other CPU power supply mode.

For example, the peripheral circuits A(21), B(22), ..., n(23) and the peripheral devices A(24), B(25), ..., m(26) operate in the "Full" mode 110, the "Down" mode 111, the "Sleep" mode 112, and the "Die" mode 113 as follows:

In the "Full" mode 110, since all the functions of the CPU 1 can be performed, all the peripheral circuits A(21), B(22), ..., n(23) and the peripheral devices A(24), B(25), ..., m(26) are in operation.

In the "Down" mode 111, the CPU 1 operates at a lowered clock speed. For example, the CPU 1 operates in the "Down" mode 111 when radio signals are transmitted from and received by a radio communication device which is incorporated in the peripheral assembly 2 shown in FIG. 1 because the clock frequency of the CPU 1 would otherwise produce noise to interfere with the radio signals.

In the "Sleep" mode 112, the CPU 1 is not in operation, and accepts only an interrupt which occurs. Therefore, none of the peripheral circuits A(21), B(22), ..., n(23) and the peripheral devices A(24), B(25), ..., m(26) are in operation. A transition from this mode is triggered by an interrupt signal from a switch, a timer, a touch panel, or the like.

In the "Die" mode 113, the CPU 1 is fully stopped. In this mode, only those of the peripheral circuits A(21), B(22), ..., n(23) and the peripheral devices A(24), B(25), ..., m(26) which can operate without instructions from the CPU 1 are alive. For example, only a peripheral circuit or device which operates with a calendar clock and has an alarm function for turning on an alarm at a scheduled time is alive, and the CPU 1 is reset into operation by the calendar clock at the scheduled time. When the CPU 1 is reset, it operates with respect to the alarm according to the status of the calendar clock.

In this manner, the peripheral circuits A(21), B(22), ..., n(23) and the peripheral devices A(24), B(25), ..., m(26) are assigned respective statuses depending on the power supply mode of the CPU 1, and when the power supply mode control register 14 outputs a status signal indicative of a power supply mode, the peripheral circuits A(21), B(22), ..., n(23) and the peripheral devices A(24), B(25), ..., m(26) operate in a corresponding status.

Figure 2:
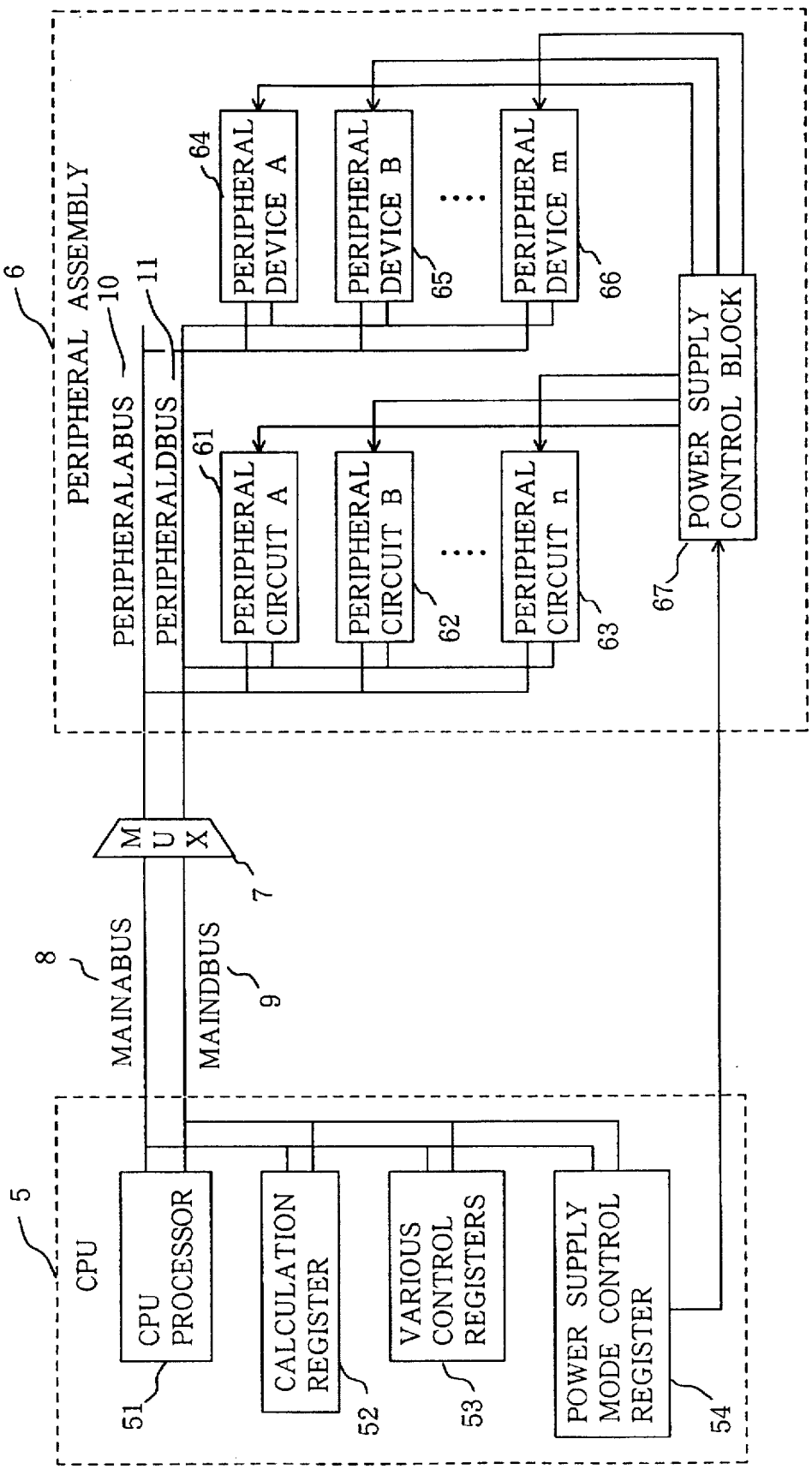
FIG. 2 is a block diagram of a power supply circuit with a power saving capability according to a second embodiment of the present invention, the power supply circuit being incorporated in a system including a CPU, a peripheral assembly, and respective buses and capable of saving electric energy primarily under the control of the CPU.

FIG. 2 shows in block form the power supply circuit with the power saving capability according to the second embodiment of the present invention, the power supply circuit being incorporated in a system including a CPU, a peripheral assembly, and respective buses. The power supply circuit according to the second embodiment is used mainly in combination with CPUs such as DSP CPUs, CISC and RISC CPUs. The principles of the present invention are based on the relationship between a power supply controller in a CPU and a power supply controller in a peripheral assembly, and does not depend on the type of buses for accessing data. Therefore, the power supply circuit according to the second embodiment is basically the same as the power supply circuit according to the first embodiment, and will not be described in detail below except its structural details.

As shown in FIG. 2, a CPU 5 according to the second embodiment comprises a CPU processor 51, a calculation register 52, various control registers 53, and a power supply mode control register 54 which are connected to a main address bus (MAINABUS) 8 and a main data bus (MAINDBUS) 9. The power supply mode control register 54 has the same arrangement and functions as the power supply mode control register 14 shown in FIG. 3. As shown in FIG. 2, a peripheral assembly 6 comprises a plurality of peripheral circuits A(61), B(62), ..., n(63), a plurality of peripheral devices A(64), B(65), ..., m(66), and a power supply control block 67. The peripheral circuits A61, B62, ..., n63 and the peripheral devices A(64), B(65), ..., m(66) are connected to a peripheral address bus (PERIPHREALABUS) 10 and a peripheral data bus (PERIPHERALDBUS) 11. The peripheral address bus 10 and the peripheral data bus 11 are connected to the main address bus 8 and the main data bus 9 through a multiplexer 7. The power supply control block 67 has the same arrangement and functions as the power supply control block 27 shown in FIG. 4.

Power supply circuits with a power saving capability according to third and fourth embodiments of the present invention have CPU power supply modes which a CPU itself has for controlling the consumption of electric energy thereby.

The power supply modes of the CPU and the power supplies of peripheral circuits and peripheral devices are controlled in accordance with the power supply conditions of the peripheral circuits and the peripheral devices.

Figure 7:
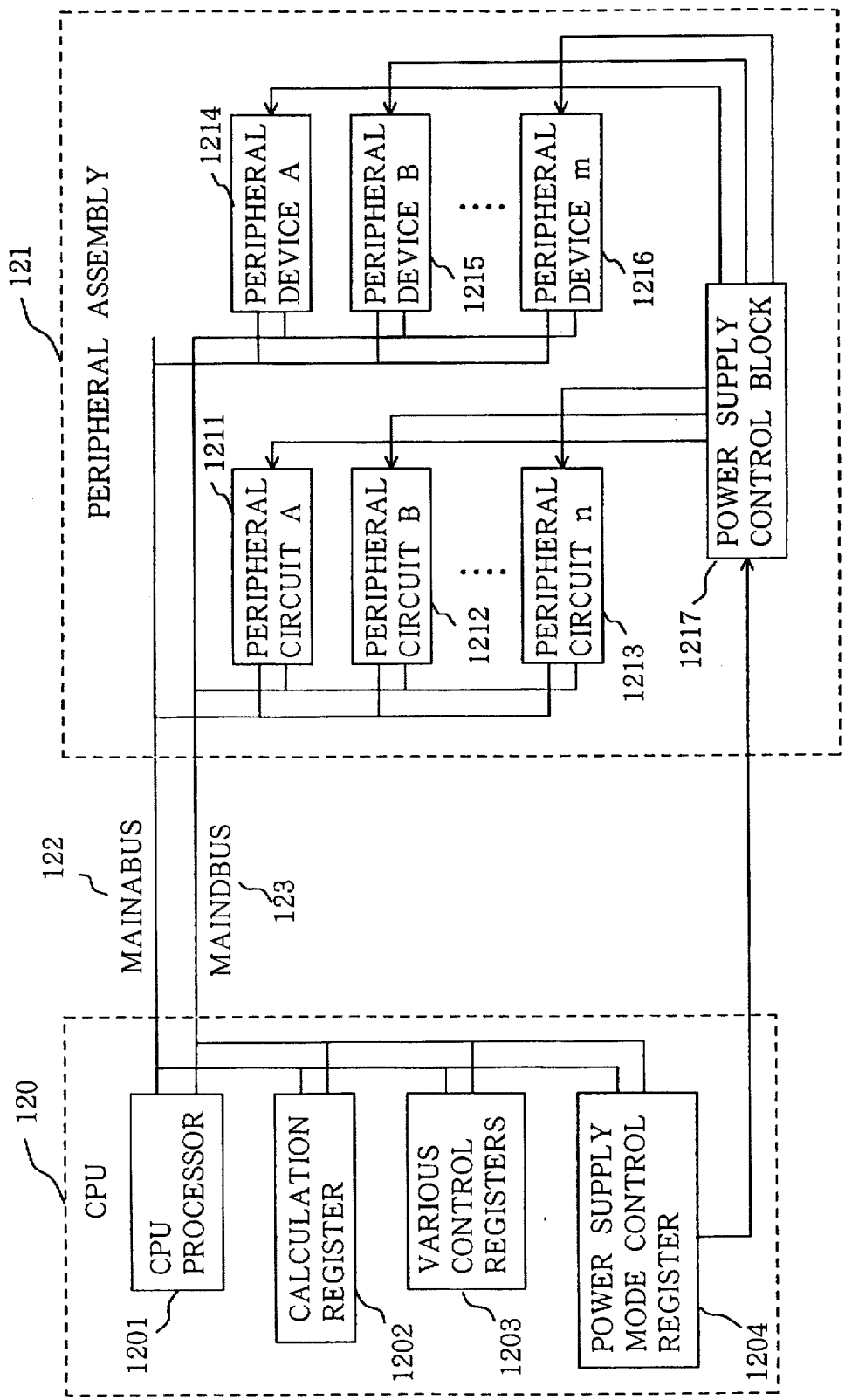
FIG. 7 is a block diagram of a power supply circuit with a power saving capability according to a third embodiment of the present invention, the power supply circuit being incorporated in a system including a CPU, a peripheral assembly, and common buses and capable of saving electric energy primarily under the control of the peripheral assembly.

FIG. 7 shows in block form the power supply circuit with the power saving capability according to the third embodiment of the present invention, the power supply circuit being incorporated in a system including a CPU, a peripheral assembly, and common buses.

The power supply circuit according to the third embodiment is used mainly in combination with microcomputers having inexpensive buses of low-bit bus configuration.

As shown in FIG. 7, a CPU 120 according to the third embodiment comprises a CPU processor 1201, a calculation register 1202, various control registers 1203, and a power supply mode control input unit 1204 which are connected to a main address bus (MAINABUS) 122 and a main data bus (MAINDBUS) 123. A peripheral assembly 121 comprises a plurality of peripheral circuits A(1211), B(1212), ..., n(1213), a plurality of peripheral devices A(1214), B(1215), ..., m(1216), and a power supply control block 1217. The peripheral circuits A(1211), B(1212), ..., n(1213) and the peripheral devices A(1214), B(1215), ..., m(1216) are connected to the main address bus 122 and the main data bus 123. The CPU 120 and the peripheral assembly 121 are substantially identical to the CPUs 1, 5 and the peripheral assemblies 2, 6 except for the power supply mode control input unit 1204 and the power supply control block 1217.

Figure 9:
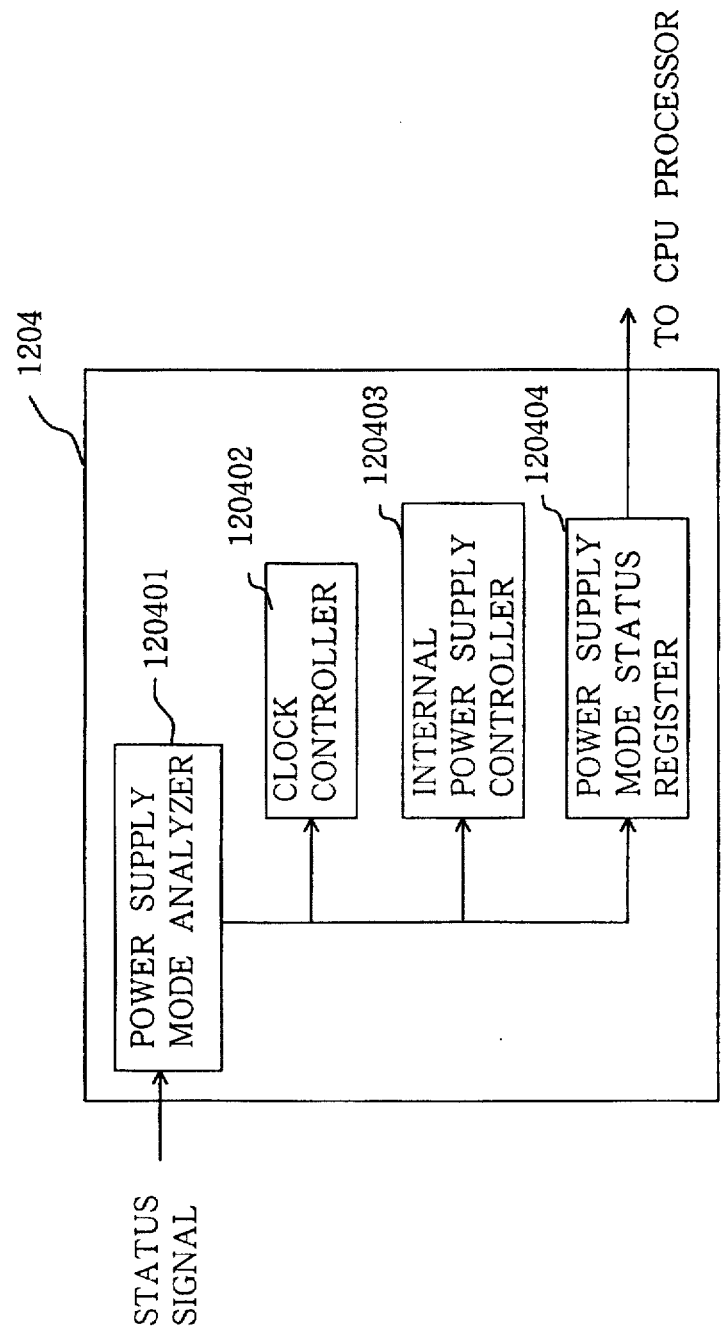
FIG. 9 is a block diagram of a power supply mode control input unit in the power supply circuit shown in FIG. 7.

As shown in FIG. 9, the power supply mode control input unit 1204 comprises a power supply mode analyzer 120401 for analyzing a status signal outputted from the power supply mode control block 1217, a clock controller 120402 for changing the frequency of a system clock used in the CPU processor 120 based on the analyzed result from the power supply mode analyzer 120401, an internal power supply controller 120403 for switching on and off an internal block of the CPU processor 1201, and a power supply mode status register 120404 for indicating a present power supply mode of the CPU 120 based on the analyzed result from the power supply mode analyzer 120401. The CPU processor 120 can recognize its own power supply status when it reads a value from the power supply mode status register 120404.

Figure 10:
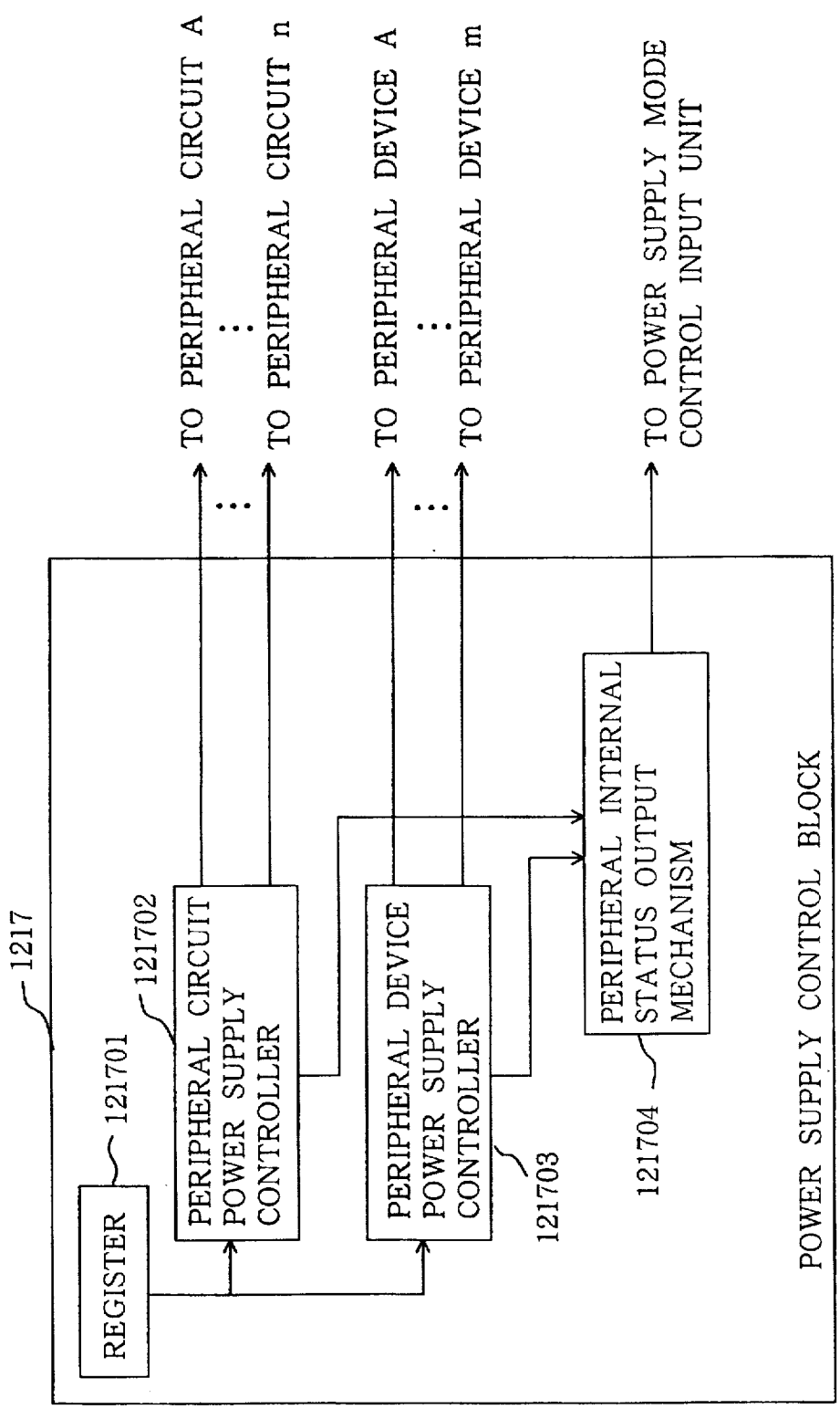
FIG. 10 is a block diagram of a power supply control block in the power supply circuit shown in FIG. 7.

As shown in FIG. 10, the power supply control block 1217 comprises a register 121701 for receiving and holding information with respect to power supply statuses of the peripheral circuits A(1211), B(1212), ..., n(1213) and the peripheral devices A(1214), B(1215), ..., m(1216), a peripheral circuit power supply controller 121702 for turning on and off the power supplies of the peripheral circuits A(1211), B(1212), ..., n(1213) based on values held in the register 121701, a peripheral device power supply controller 121703 for turning on and off the power supplies of the peripheral devices A(1214), B(1215), ..., m(1216) based on values held in the register 121701, and a peripheral internal status output mechanism 121704 for indicating internal statuses of the power supplies of the peripheral circuits A(1211), B(1212), ..., n(1213) and the peripheral devices A(1214), B(1215), ..., m(1216) based on signals from the peripheral circuit power supply controller 121702 and the peripheral device power supply controller 121703.

The internal statuses of the power supplies which are indicated by the peripheral internal status output mechanism 121704 can be referred to by the power supply mode control input unit 1204, and the CPU 120 determines its own power supply mode based on the internal statuses of the power supplies referred to by the power supply mode control input unit 1204.

The power supply mode control input unit 1204 changes internal statuses of the power supply of the CPU 120 in response to an external input signal. The power supply control block 1217 is a register for varying power supply statuses of the peripheral circuits A(1211), B(1212), ..., n(1213) and the peripheral devices A(1214), B(1215), ..., m(1216). Specifically, the power supplies of the peripheral circuits A(1211), B(1212), ..., n(1213) and the peripheral devices A(1214), B(1215), ..., m(1216) are turned on and off by writing values indicative of power supply statuses of the peripheral circuits A(1211), B(1212), ..., n(1213) and the peripheral devices A(1214), B(1215), ..., m(1216) in the power supply control block 1217.

Alternatively, power supply statuses of the peripheral circuits A(1211), B(1212), ..., n(1213) and the peripheral devices A(1214), B(1215), ..., m(1216) may be determined by initial settings, and in response to signals indicative of ends of operation of the peripheral circuits A(1211), B(1212), ..., n(1213) and the peripheral devices A(1214), B(1215), ..., m(1216); control values in the power supply control block 1217 may be varied according to the pattern of the signals indicative of ends of operation. In this manner, the power supplies of the CPU 120 and the peripheral assembly 121 can automatically be varied depending on the status of an external device.

Each of the peripheral circuits A(1211), B(1212), ..., n(1213) and the peripheral devices A(1214), B(1215), ..., m(1216) has an input/output function such as a button switch, a display unit, a telephone set (radio telephone set), a calendar clock, or the like.

Figure 11:
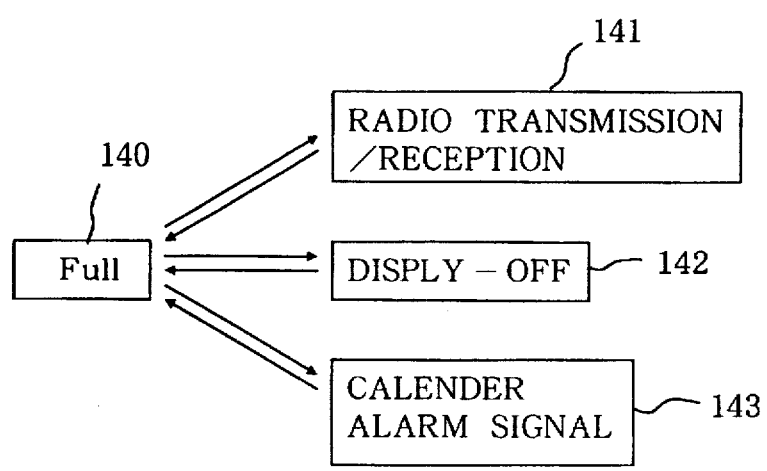
FIG. 11 is a diagram showing how transitions are made between power supply modes of the peripheral assembly.

Power supply modes of the peripheral assembly and transitions between these power supply modes are shown in FIG. 11. The power supply modes shown in FIG. 11 include a "Full" mode in which the peripheral assembly makes various calculations and processing operations, "Radio transmission/reception" mode in which the peripheral assembly transmits and receives radio signals, a "Display-off" mode which is a power-saving mode in which there is no input entry for a given period of time, and a "Calendar alarm signal" mode in which the peripheral assembly is stopped in its entire operation and waits for an alarm signal based on a calendar clock.

The transitions to these power supply modes are initiated as shown in Table 1 below.

TABLE 1

| Full | | |
|---|---|---|
| → | Radio transmission/reception | Signals transmitted and received |
| ← | tion | Signal transmission and reception ended |
| → | Display off | No input and output signals for given period of time |
| ← | | Input and output signals produced |
| → | Calendar alarm signal | Power supplies off |
| ← | | Alarm signal produced |

These power supply modes are represented by 2-bit power supply mode control signals generated by the power supply control block 1217.

The power supply circuit according to the third embodiment operates as follows: A desired power supply mode is established in the power supply control block 1217.

The power supply control block 1217 changes power supply statuses of the peripheral circuits A(1211), B(1212), ..., n(1213) and the peripheral devices A(1214), B(1215), ..., m(1216), and generates a power supply mode control signal as a status signal indicative of a power supply status. In response to the status signal supplied to the power supply mode control input unit 1204, the CPU 120 changes its internal power supply modes depending on the power supply status.

The internal power supply modes of the CPU 120 are the same as the power supply modes shown in FIG. 6, and a transition from one to another of the internal power supply modes is made in response to a status signal from the power supply control block 1217.

Figure 8:
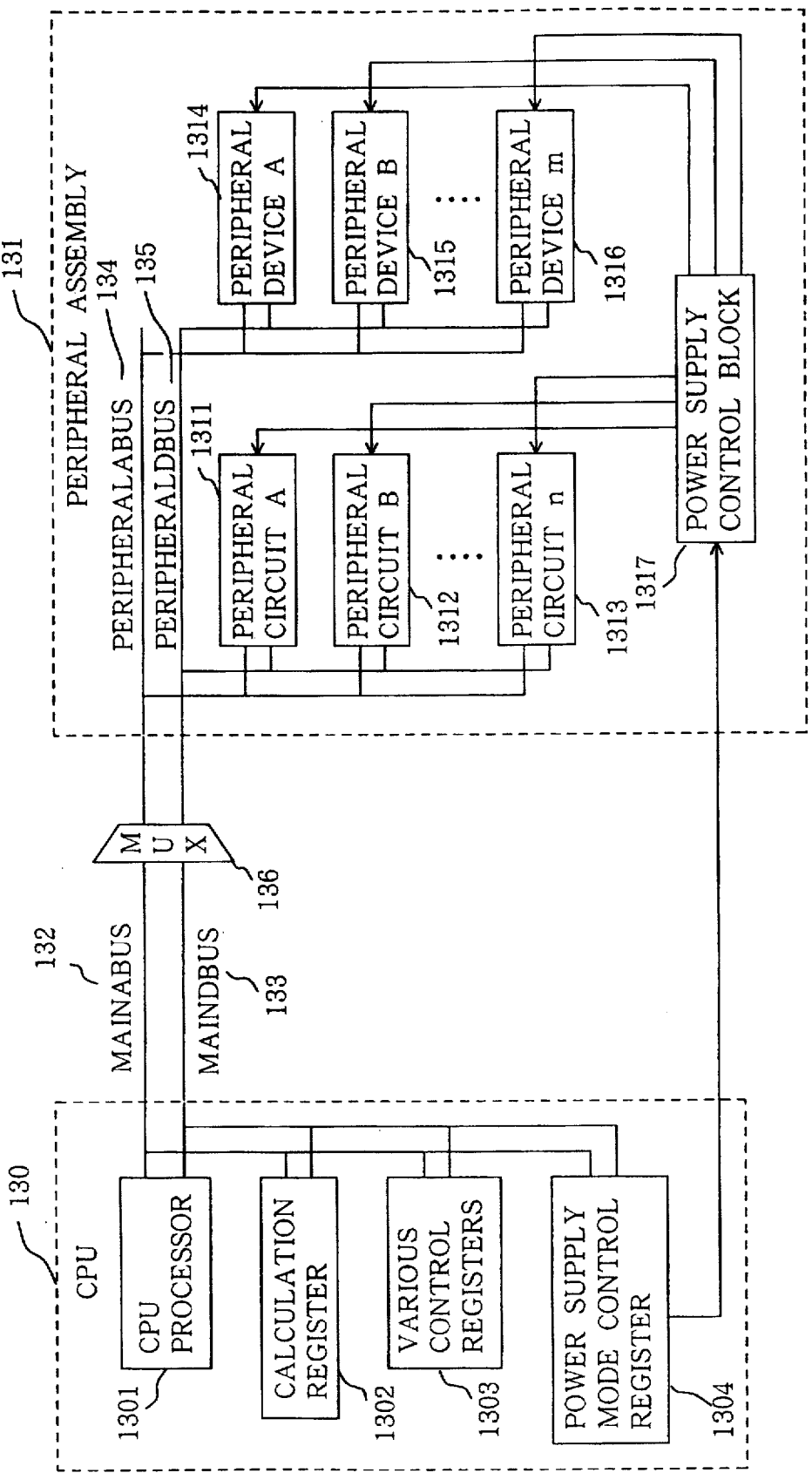
FIG. 8 is a block diagram of a power supply circuit with a power saving capability according to a fourth embodiment of the present invention, the power supply circuit being incorporated in a system including a CPU, a peripheral assembly, and respective buses and capable of saving electric energy primarily under the control of the peripheral assembly.

FIG. 8 shows in block form the power supply circuit with the power saving capability according to the fourth embodiment of the present invention, the power supply circuit being incorporated in a system including a CPU, a peripheral assembly, and respective buses. The power supply circuit according to the fourth embodiment is used mainly in combination with CPUs such as DSP CPUs, CISC and RISC CPUs. The principles of the present invention are based on the relationship between a power supply controller in a CPU and a power supply controller in a peripheral assembly, and does not depend on the type of buses for accessing data. Therefore, the power supply circuit according to the fourth embodiment is basically the same as the power supply circuit according to the third embodiment, and will not be described in detail below except its structural details.

As shown in FIG. 8, a CPU 130 according to the fourth embodiment comprises a CPU processor 1301, a calculation register 1302, various control registers 1303, and a power supply mode control input unit 1304 which are connected to a main address bus (MAINABUS) 132 and a main data bus (MAINDBUS) 133. The power supply mode control input unit 1304 has the same arrangement and functions as the power supply mode control input unit 1204 shown in FIG. 7. As shown in FIG. 8, a peripheral assembly 131 comprises a plurality of peripheral circuits A(1311), B(1312), . . . , n(1313), a plurality of peripheral devices A(1314), B(1315), . . . , m(1315), and a power supply control block 1317. The peripheral circuits A(1311), B(1312), . . . , n(1313) and the peripheral devices A(1314), B(1315), . . . , m(1316) are connected to a peripheral address bus (PERIPHREALABUS) 134 and a peripheral data bus (PERIPHERALDBUS) 135. The peripheral address bus 134 and the peripheral data bus 135 are connected to the main address bus 132 and the main data bus 133 through a multiplexer 136. The power supply control block 1317 has the same arrangement and functions as the power supply control block 1217 shown in FIG. 7.

While preferred embodiments of the present invention have been described using specific terms, such description is for illustrative purposes only, and it is to be understood that changes and variations may be made without departing from the spirit or scope of the following claims.

What is claimed is:

1. A power supply circuit comprising:

a central processing unit; and a peripheral assembly connected to said central processing unit;

said central processing unit having a register for establishing a status of an internal power supply of the central processing unit, a first mechanism for changing the internal power supply into the status established by said register, and a second mechanism for outputting a status signal indicative of said status;

said peripheral assembly having a peripheral circuit, a peripheral device, and control means for changing power supply statuses and clock statuses of the peripheral circuit and the peripheral device based on the status signal outputted from said second mechanism.

2. A power supply circuit according to claim 1, wherein said control means comprises means for determining priority ranks of the peripheral circuit and the peripheral device based on said status signal and changing the power supply statuses of the peripheral circuit and the peripheral device according to the determined priority ranks.

3. A power supply circuit according to claim 1, wherein said register, said first mechanism, and said second mechanism comprise a power supply mode control register, and said control means comprises a power supply control block, and wherein said power supply mode control register controls the power supply statuses and clock statuses which are changed by said power supply control block.

4. A power supply circuit according to claim 3, wherein said power supply control block is programmable by an external signal.

5. A power supply circuit comprising:

a central processing unit; and a peripheral assembly connected to said central processing unit;

said peripheral assembly having a peripheral circuit, a peripheral device, a power supply control block for varying power supply statuses or clock frequencies of the peripheral circuit and the peripheral device according to a setting, and a first mechanism for outputting a status signal indicative of the power supply statuses of the peripheral circuit and the peripheral device based on the setting;

said central processing unit having a second mechanism for changing power supply statuses and clock statuses thereof based on the status signal outputted from said first mechanism.

6. A power supply circuit according to claim 5, wherein said second mechanism comprises means for determining priority ranks of the peripheral circuit and the peripheral device based on said status signal and changing the power supply statuses and clock statuses of said central processing unit based on said status signal.

7. A power supply circuit according to claim 5, wherein said second mechanism comprises power supply mode control input means for changing the power supply statuses of the central processing unit as controlled by data established in said power supply control block.

8. A power supply circuit according to claim 5 or 7, wherein said power supply control block is programmable by an external signal.

* * * * *